United States Patent
Prajapat et al.

(10) Patent No.: US 8,719,434 B2
(45) Date of Patent: May 6, 2014

(54) AGNOSTIC PERIPHERAL CONTROL FOR MEDIA COMMUNICATION APPLIANCES

(75) Inventors: Surendra Prajapat, Santa Clara, CA (US); Arthur G. Howarth, Orleans (CA)

(73) Assignee: Cisco Technology, Inc., San Jose, CA (US)

( * ) Notice: Subject to any disclaimer, the term of this patent is extended or adjusted under 35 U.S.C. 154(b) by 1772 days.

(21) Appl. No.: 11/027,350

(22) Filed: Dec. 29, 2004

(65) Prior Publication Data

US 2006/0143318 A1 Jun. 29, 2006

(51) Int. Cl.
*G06F 15/16* (2006.01)

(52) U.S. Cl.
USPC .......................... 709/230; 709/201; 709/232

(58) Field of Classification Search
USPC .................. 709/201, 202, 203, 230, 231, 232
See application file for complete search history.

(56) References Cited

U.S. PATENT DOCUMENTS

| | | | | |
|---|---|---|---|---|
| 5,557,318 | A * | 9/1996 | Gabriel ........................... | 725/93 |
| 6,119,178 | A * | 9/2000 | Martin et al. .................... | 710/72 |
| 6,122,259 | A * | 9/2000 | Ishida ............................ | 370/260 |
| 6,198,414 | B1 * | 3/2001 | McPherson et al. ............. | 341/76 |
| 6,239,728 | B1 * | 5/2001 | McPherson et al. ............. | 341/61 |
| 7,151,801 | B2 * | 12/2006 | Grossberg et al. ........ | 375/240.27 |
| 7,245,662 | B2 * | 7/2007 | Piche et al. ................. | 375/240.2 |
| 7,283,178 | B2 * | 10/2007 | Dahlseid et al. .............. | 348/553 |
| 7,356,629 | B2 * | 4/2008 | Killermann .................... | 710/105 |
| 2003/0112996 | A1 * | 6/2003 | Holliman et al. ............. | 382/100 |
| 2004/0117491 | A1 * | 6/2004 | Karaoguz et al. ............. | 709/229 |
| 2005/0021626 | A1 | 1/2005 | Prajapat et al. ............... | 709/205 |
| 2006/0003328 | A1 * | 1/2006 | Grossberg et al. ................ | 435/6 |
| 2006/0143318 | A1 * | 6/2006 | Prajapat et al. ................... | 710/8 |
| 2007/0130610 | A1 * | 6/2007 | Aarnio et al. ................. | 725/134 |

OTHER PUBLICATIONS

Office Action from Chinese Patent Application No. 20050034453.5 dated Jul. 4, 2008.
International Search Report, mailed Mar. 6, 2007, from related International Application No. PCT/US05/44172, 5 pp. including Notification of Transmittal.
Written Opinion of the International Searching Authority, mailed Mar. 6, 2007, from related International Application No. PCT/US05/44172, 3 pp.
Rosenberg et al, "SIP: Session Initiation Protocol" RFC 3261, Jun. 2002, 269 pp.
CN patent application No. 20050034453.5, Office Action mailed Jul. 4, 2008.
CN patent application No. 20050034453.5, Notification of Grant mailed Apr. 3, 2009.
EP patent application No. 05853163, European Search Report mailed Feb. 6, 2013.
Bellavista et al., "Middleware-level QoS differentiation in the wireless internet: the ubiQoS solution for audio streaming over Bluetooth," Proceedings of the First International Conference on Quality of Srvie in Heterogeneous Wired/Wireless Networks, 2004.

\* cited by examiner

*Primary Examiner* — Dhairya A Patel

(57) ABSTRACT

The present invention provides enhanced flexibility regarding the use of media devices, including media communication peripheral devices, in communication sessions. Communication sessions can be conducted between devices having differing capabilities. According to some implementations, requests for communication sessions may be accepted according to the capabilities and/or preferences indicated for local media communication peripheral devices. Some components of an incoming communication signal may be selected for reproduction by a local media communication peripheral device and others may be ignored.

22 Claims, 13 Drawing Sheets

| Context Name | Media Type | Preferred Interface | Input / Output Device | Fallback Interface | Input / Output Device |
|---|---|---|---|---|---|
| AudioConf | Data | Keypad | | None | |
| AudioConf | AudioIn | HQ-Microphone | | Microphone | |
| AudioConf | Audio Out | HQ-Speaker | | Speaker | |

*Fig. 2B*

| Context Name | Media Type | Preferred Interface | Input / Output Device | Fallback Interface | Input / Output Device |
|---|---|---|---|---|---|
| AudioConf | Data | Keypad | KB-1 | None | |
| AudioConf | Audio-In | HQ-Microphone | | Microphone | Mic-1 |
| AudioConf | Audio-Out | HQ-Speaker | | Speaker | Spk-1 |

*Fig. 2C*

| Context Name | Media Type | Preferred Interface | Input / Output Device | Fallback Interface | Input / Output Device |
|---|---|---|---|---|---|
| AudioConf | Data | Keypad | KB-1 | None | |
| AudioConf | Audio-In | HQ-Microphone | HQMic-1 | Microphone | Mic-1 |
| AudioConf | Audio-Out | HQ-Speaker | HQSpk-1 | Speaker | Spk-1 |

*Fig. 2D*

```
<?XML version="1.0" encoding="UTF-8"?>         — 405
<Call-Context>                                  — 410
<Name>Default</Name>
<destination><regular_expr></destination>       — 420
<Caller>7689</Caller>                           — 430
<Action>Answer</Action>
<Device type="Microphone">                      — 440
<Action>On</Action>
</Device>                                        — 450
<Media>
<URL>http://mypictures.com</URL>                — 460
</Media>
</Call-Context>                                  — 490
<MD5Digest>0324aebd1212345aa3411ffae557788</MD5Digest>  — 470
```

*Fig. 4*

```
INVITE sip:13039263142@Den1.level3.com SIP/2.0
Via: SIP/2.0/UDP den3.level3.com
From: sip:13034513355@den3.level3.com
To: sip:13039263142@Den1.level3.com
Call-ID: DEN1231999021712095500999@Den1.level3.com
CSeq: 8348 INVITE
 Contact: <sip:jpeterson@level3.com>
Content-Length: 436
 Content-Type: multipart/mixed; boundary=unique-boundary-1

--unique-boundary-1
Content-Type: application/SDP; charset=ISO-10646 v=0
o=jpeterson 2890844526 2890842807 IN IP4 126.16.64.4
s=SDP seminar
c=IN IP4 MG122.level3.com
t= 2873397496  2873404696
m=audio 9092 RTP/AVP 0 3 4
--unique-boundary-1
Content-Type: application/context-xml
<?XML version="1.0" encoding="UTF-8"?>
<Call-Context>
 <Name>PTT</Name>
 <Destination>PTT.*</Destination>
 <Caller>7869</Caller>
 <Action>Answer</Action>
 <Device type="Speaker">
  <Action>On</Action>
 </Device>
 <Device type="Microphone">
  <Action>Mute</Action>
 </Device>
 <Group>SALES</Group>
 <GroupSecret>encrypted-do-no-tell</GroupSecret>
</Call-Context>
<MD5Digest>0324aebd12123456aa3411ffae557788</MD5Digest>
--unique-boundary-1--
```

*Fig. 5*

AGNOSTIC PERIPHERAL CONTROL FOR MEDIA COMMUNICATION APPLIANCES

BACKGROUND OF THE INVENTION

1. Field of the Invention

The present invention relates to communication networks. More particularly, the present invention relates to the use of media communication appliances in communication networks.

2. Description of the Related Art

Current media communication appliances are limited due to the close coupling of media communication peripheral interfaces (e.g., speakers, microphones and displays) and the states of such interfaces (e.g., enabled, disabled, on-hook or off-hook). Communication protocols are geared towards knowing the capability of an endpoint, e.g., of a telephone, of media communication peripheral devices associated with a personal computer, etc.

If an endpoint were to receive a communications request but did not have the capability specified in the communications request, the endpoint would refuse that request. For example, if a telephone lacking video capability were to receive a video conferencing call, the telephone would refuse the video conferencing call.

As used herein, a "call" can mean any type of communication session, or a request for such a session. As such, a "call" is not limited to a voice communication, but also includes communications that have video and/or other data components.

Because of the tight coupling of media communication peripheral devices and related communications protocols, it is very difficult for third-party hardware or software to integrate on a media appliance. The media communication peripheral device's behavior is fixed and independent of call context or feature requests.

Moreover, no provision is made for on-the-fly peripheral behavior change, whether based on the call context or otherwise. For example, if a person were to disconnect a media communication peripheral device (or to change the state to "available") after a communication session had begun, the communication session would be terminated as to that person.

It would be desirable to have greater flexibility regarding the use of media devices, including media communication peripheral devices, for communication sessions.

SUMMARY OF THE INVENTION

The present invention provides greater flexibility regarding the use of media devices, including media communication peripheral devices, in communication sessions. Communication sessions can be conducted between devices having differing capabilities. According to some implementations, requests for communication sessions may be accepted according to the capabilities and/or preferences indicated for local media communication peripheral devices. Some components of an incoming communication signal may be selected for reproduction by a local media communication peripheral device and others may be ignored.

Alternative implementations provide for preferences to be specified in requests for communication. In some such implementations, communication sessions will be conducted only if the participants have media communication peripheral devices with capabilities specified in a communication request. Some preferred implementations allow for insertions and removals of local media communication peripheral devices while a communication session is ongoing. Some implementations allow best-effort selection of the local media device based on the communication context if multiple such devices with some common capabilities are present.

Some implementations of the invention provide a method of participating in a communication session. The method includes the following steps: receiving a plurality of first communication signals from a communicating network; selecting at least a first component of a first communication signal for communication with a first local media communication peripheral device; and preparing the first component of the first communication signal for transmission to the first local media communication peripheral device. The method may include the step of transmitting the first component of the first communication signal to the first media communication peripheral device.

The first communication signal may include a first data component, a first audio component and/or a first video component. A first attribute of the first component may differ from a second attribute prepared for communication with the first local media communication peripheral device.

The first attribute may be, for example, a first data quality and the second attribute may be a second data quality. In one example, the first component is an audio component, the first data quality is superior to the second data quality and the preparing step involves downgrading the audio component from the first data quality to the second data quality. The selecting and preparing steps may be performed according to stored preference data.

The method may also include these steps: receiving a local signal from a second local media communication peripheral device, the local signal having a third attribute that differs from a corresponding attribute of first communication signals received from the communication network; forming a second communication signal based, at least in part, on the local signal, the second communication signal including a second data component, a second audio component and/or a second video component; and transmitting the second communication signal to the communication network.

The first communication signal may include preference data regarding at least one component of the first communication signal. A differentiated billing scheme may be applied for the communication session, e.g., based in part on data quality of communication signals transmitted to one or more local media communication peripheral devices.

The stored preference data can be components of stored registration data. Registration data may, for example, be dynamically compiled when a media communication peripheral device is connected to a host device. The registration data can include data selected from context data, media type data, preference data and interface data.

The second communication signal may include preference data regarding at least one component of the second communication signal. For example, the preference data may indicate a preference that a portion of the second communication signal corresponding to the local signal will be reproduced by a remote media communication peripheral device according to the third attribute.

The method may also include these steps: determining that the first local media communication peripheral device has been disconnected; determining that a second local media communication peripheral device has been connected; dynamically compiling registration data for the second local media communication peripheral device, the registration data comprising data selected from context data, media type data, preference data and interface data; selecting a second component of a first communication signal for communication with the second local media communication peripheral device; preparing the second component of the first communication signal for transmission to the second local media communication peripheral device; and transmitting the second component of the first communication signal to the second local media communication peripheral device.

Alternative aspects of the invention provide other methods for providing a communication session. One such method includes these steps: providing a first communication signal from a communication network, the first communication signal including a first data component, a first audio component and/or a first video component; determining a first data quality of least a first component of the first communication signal prepared for communication with a first local media communication peripheral device; and billing for the communication session based in part on the first data quality.

Some implementations of the invention provide alternative methods for providing a communication session. One such method includes these steps: receiving a first communication signal from a communication network, the first communication signal comprising at least one component selected from the group consisting of a first data component, a first audio component and a first video component; determining a first data quality of least a first component of the first communication signal; and billing for the communication session based in part on the first data quality.

The foregoing methods, as well as other methods described herein, may be implemented in software, in hardware, etc. These and other features and advantages of the invention will be described in more detail below with reference to the associated drawings.

BRIEF DESCRIPTION OF THE DRAWINGS

FIGS. 2A-2D depict a context table being populated according to some implementations of the invention.

FIG. 4 illustrates one exemplary communication context in XML form, according to an aspect of the invention.

FIG. 5 illustrates an exemplary SIP INVITE with multi-part MIME contents containing a PTT (Push to Talk) communication context in XML form, according to an aspect of the invention.

DETAILED DESCRIPTION OF THE INVENTION

Figure 1:
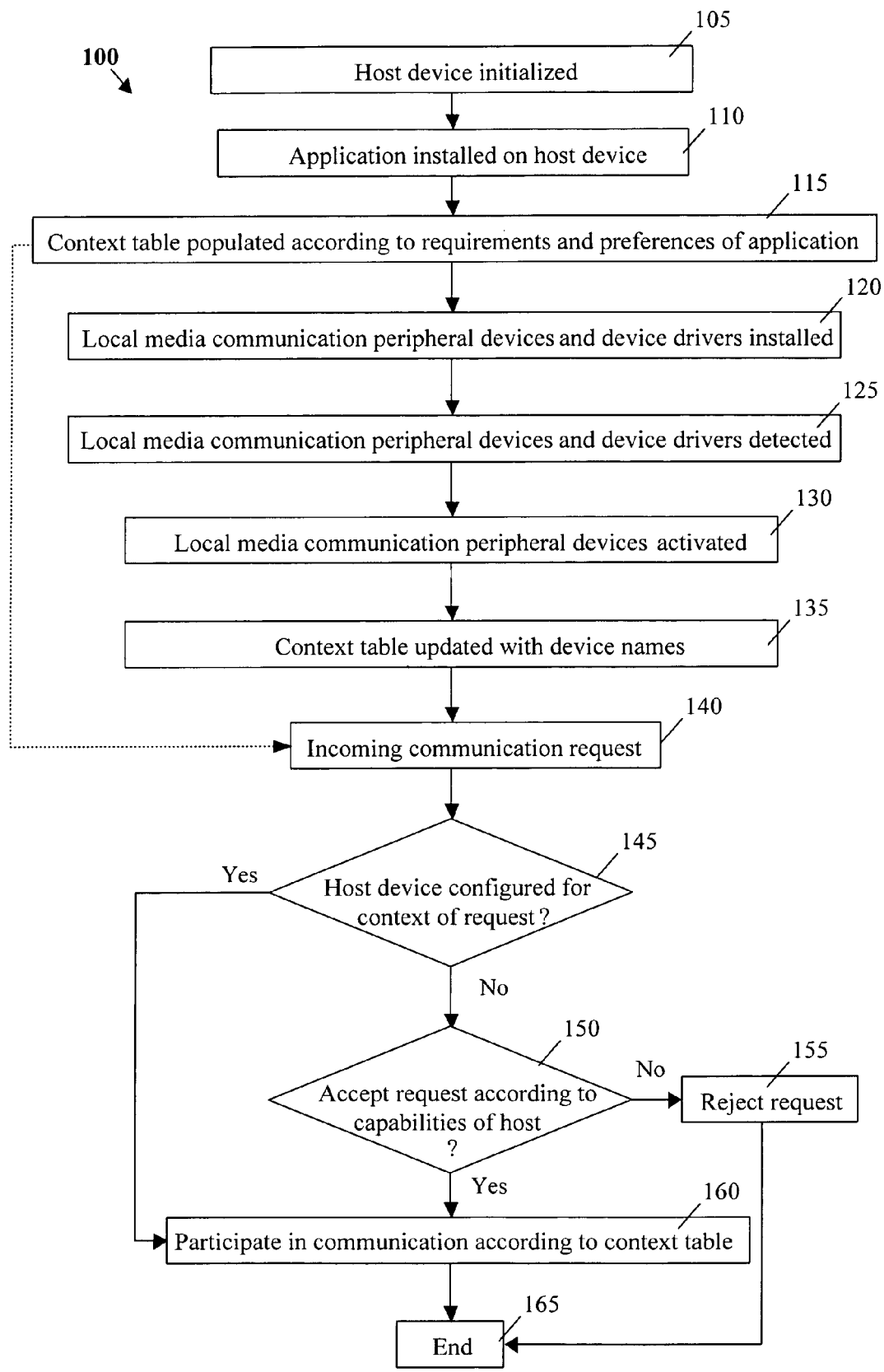
FIG. 1 is a flow chart that provides an overview of some implementations of the present invention.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention provides methods and devices for providing enhanced flexibility regarding the use of media devices, including media communication peripheral devices, in communication sessions. Increased flexibility is presented herein for both the call-receiving and call-initiating side. Some aspects of the invention allow for decoupling of interfaces from the software applications on a media device. Some implementations of the invention allow for dynamic addition, removal or modification of interfaces on a media device. Some implementations allow for a communications request to "specify" the preferred context (or profile) of the remote media device and interfaces to use.

According to some implementations, communication sessions can be conducted between devices having differing capabilities and/or media devices can answer communications requests of the same context in dissimilar fashions. For example, requests for communication sessions may be accepted according to the capabilities and/or preferences indicated for local media communication peripheral devices. Some components of an incoming communication signal may be selected for reproduction by a local media communication peripheral device and others may be ignored. This also allows for the "end-user" to choose how to accept calls based upon personal choices (time of day, caller ID, etc)

For example, in some such implementations of the invention, if a conventional telephone not configured for reproducing video data were to receive a communication request for a video conferencing call, it would refuse a video component of the communication request but would accept an audio component of the communication request. Alternatively, or additionally, an endpoint may have a local media communication peripheral device of a type that can reproduce component of a communication but will reproduce the component at a lower data quality. For example, if one endpoint transmitted a communication in High Definition video and high-quality audio, a receiving endpoint may elect to reproduce the communication in low-quality video and low-quality audio.

Alternatively, an endpoint having a local media communication peripheral device of a type that can reproduce component of a communication at a higher quality may choose, at least under certain circumstances, to reproduce the communication at a lower quality. The endpoint can decide on what components of a communication the endpoint will accept and the conditions for accepting these components. For example, the endpoint may be subject to differentiated billing according to the type of endpoint services being used, including but not limited to the quality of reproducing a communication.

In some implementations, an endpoint may select between multiple local media communication peripheral devices that are not differentiated by quality, but instead by a user preference or some other characteristic. For example, an endpoint may select a wired headset when a user is working at a particular location (e.g., at a desk) and may choose a wireless headset when the user is not at that location but instead is "roaming."

Some such implementations may involve the use of a proximity detection device, such as a radio frequency identification ("RFID") reader, that is in communication with the endpoint. Relevant methods and devices are described in U.S. patent application Ser. No. 10/866,285, entitled "Methods and Devices for Assigning RFID Device Personality" and filed on Jun. 9, 2004, which application is hereby incorporated by reference in its entirety. According to some such implementations, the user may have an RFID tag (e.g., on a card, a keychain, or other object) that can be detected when the RFID tag is within a known distance of the RFID reader.

Some implementations of the invention provide for preferences to be specified in requests for communication. In some such implementations, communication sessions will be conducted only if the participants have media communication peripheral devices with capabilities specified in a communication request.

As previously noted, some preferred implementations allow for dynamic insertions and removals of local media communication peripheral devices; in this context, "dynamic" means while the device is active and capable of receiving calls or even when a communication session is ongoing. Some such implementations use an interface subsystem (e.g. a USB, FireWire™, BlueTooth™, IEEE 802.11, ) to handle such dynamic insertions and removals.

As used herein, "context" is an important concept. A communication signal can have a context and a device can have a context. The context of a communication signal involves, for example, the components that are included in the communication signal. The communication signal may, for example, have a data component, an audio component and/or a video component. The context of a device receiving a communication signal involves how a communication signal is processed. For example, the device's context may determine whether and how a communication signal is answered, which components of the communication signal are selected for reproduction and how the components are reproduced (e.g., by what local media communication peripheral device a component of the communication signal is reproduced and what quality/fidelity level will apply to the reproduction).

Some preferred implementations of the invention store local device context, media type, preferences, interface type, etc. These data may be stored, e.g., in a registration table. Some such implementations require software to store contexts that require specific interface and/or peripheral types, so that these interface and/or peripheral types may be applied when needed.

FIG. 1 is a flow chart that outlines method 100 according to some implementations of the invention. Those of skill in the art will appreciate that the steps of the methods described herein, including but not limited to method 100, need not be performed (and in some implementations are not performed) in the order shown. Moreover, some implementations of method 100 may include more or fewer steps than those shown in FIG. 1.

In this example, we start with a media device, also referred to herein as a host device, without any input/output interfaces but with extension ports. Here, the media device has 6 USB ports.

Figure 2A:
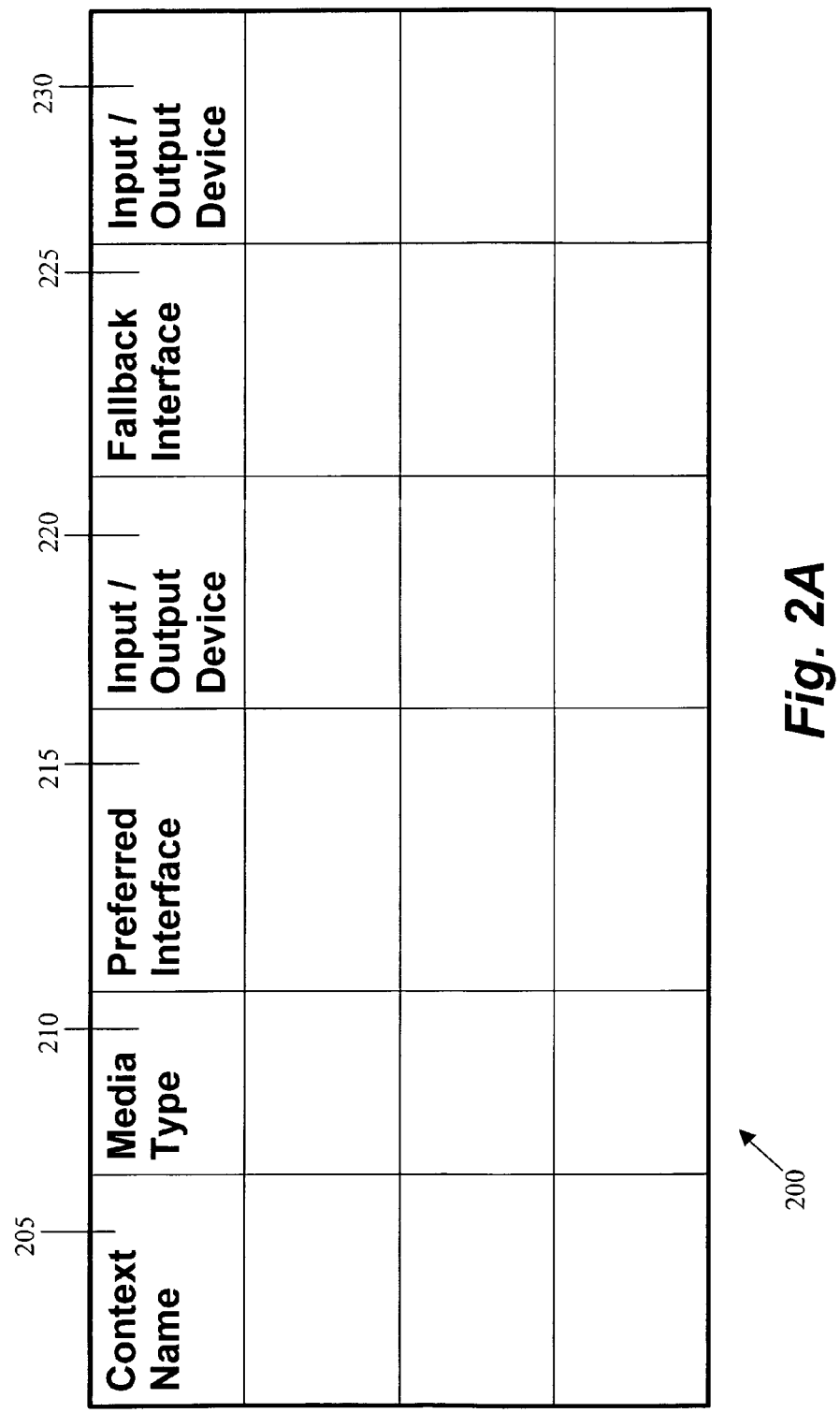

FIG. 2A illustrates one example of a context table according to the invention. Such a context table could be stored in a volatile or non-volatile memory of the host device. As shown in FIG. 2A, context table 200 (also referred to herein as a registration table) of the host device now contains no entries. As method 100 proceeds, fields 205 through 230 of context table 200 will be populated.

In step 105 of method 100, a host device is initialized, e.g., according to instructions from a boot program stored in a non-volatile memory. In step 110, an application is installed on the host device that requires an audio input device and an audio output device. In this example, the application prefers a high-quality microphone and a high-quality speaker. However, the application can use any microphone or speaker. The application also requires a standard keypad. The application specially supports audio conferencing.

In step 115, the context table is populated according to the requirements and preferences of the application. FIG. 2B illustrates the state of context table 200 after step 115. In context name field 205, an audio conferencing capability "AudioConf" has three associated media types, as indicated by the "Data," "Audio In" and "Audio-Out" entries of media type field 210. As noted in preferred interface field 215, the preferred interfaces (also known as local media communication peripheral devices) for these three media types are keypad, high-quality microphone and high-quality speaker. Fallback interfaces (standard microphone and speaker) are indicated in field 225.

In this example, if a communications request were now to be received by the host device having a context of "AudioConf" at this point, it would be determined in step 145 that the host device is not configured for the context of the request. Moreover, it would be determined in step 150 that there are no local media communication peripheral devices to allow a user to answer the request. Accordingly, the request would be rejected. (Step 155.) However, in alternative implementations, the call is accepted. Such alternative implementations provide a user with the option of installing one or more local media communication peripheral devices after receiving the request.

In step 120, the user installs local media communication peripheral devices. Here, the user installs a standard quality USB microphone, speaker and keyboard on the host device. Device drivers for each of the local media communication peripheral devices are also installed at this time; such device drivers are installed on the host device via methods known to those of skill in the art, e.g., by downloading the device drivers from a network or by copying the device drivers from a local storage medium.

In step 125, the local media communication peripheral devices and device drivers are detected by the subsystem (which is a USB subsystem in this case) and in step 130 the devices are activated. The drivers then update context table 200.with the USB device name (step 135.

In other implementations, the context table (or another data structure for storing registration/context information) is populated and depopulated according to alternative methods. In some such implementations, a program other than a device driver includes instructions for adding and removing this information. In still other implementations, the user can add and remove this information using, e.g., an I/O device such as a keypad, a mouse, etc.

As shown in FIG. 2C, because the microphone and speaker are standard quality, the entries Mic-1 and Spk-1 are made in fallback interface field 225 and not preferred interface field 215. However, the standard quality keyboard is preferred here, so the entry KB-1 is made in preferred interface field 215.

If a communications request were to come in (step 140) with a context of "AudioConf" at this stage, it would be determined in step 145 that the host device is configured for the context of the request. Accordingly, the request would be accepted and the user could participate in the communication according to the context table. (Step 160.)

In this example, if the incoming communication includes a high-quality audio component (as preferred by the AudioConf context), the audio component would be reproduced at a lower audio quality by standard speaker "Spk-1." For example, if the audio component of the incoming communication has a sample rate of N, the standard speaker might only reproduce the audio component at N/4, e.g., by reproducing every fourth sample.

The same principles apply to the transmission and receipt of other components of a communication, e.g., to a video component. For example, an incoming communication may include a video component of a lower quality than can (or will) be reproduced by a local video device. For example, the incoming communication may include a video component in MPEG-1 format, whereas the local video device may be capable of reproducing video in MPEG-2 format. The video component in MPEG-1 format will be understood by the MPEG-2 video devices, but the video quality of the reproduction will be inferior to the video quality of a reproduction of MPEG-2 video. Relevant methods for communications between devices using different types of audio and video encoding are described, for example, in RFC 3551, "RTP Profile for Audio and Video Conferences with Minimal Control," which is hereby incorporated by reference for all purposes.

However, in alternative implementations, the sender or receiver could specify that the communication will only be reproduced under certain conditions, e.g., if one or more components of the communication can be reproduced at a predetermined quality level. For example, an incoming communication could require that the receiver have the capability of reproducing a high-definition video component. If the receiver lacked this capability, the communication request would be rejected. (Step 155.) Some exemplary formats for communication contexts will be described below.

Suppose that the user subsequently installs a high-quality USB microphone, speaker and keypad on the host device. As before, the appropriate device drivers would also be installed on the media device. After the appropriate hardware and drivers are detected by the USB subsystem (in this case) and the devices are activated, the drivers would then update the context table with the USB device names. Because the microphone and speaker are high-quality devices, the entries would be made in preferred interface field 215 and not fallback interface field 225. (See FIG. 2D.) One of skill in the art will appreciate that there is no limitation to the number of quality tiers that can be defined; only two (preferred and fallback) are used here to illustrate the example.

If a communications request with a context "AudioConf" were to come in at this time, the request would be accepted. The high-quality microphone and speaker would be used, because they are the preferred local media communication peripheral devices for the AudioConf context, according to context table 200.

If any of the interfaces were subsequently removed, the process detailed on the previous pages would be reversed. For example, if the user subsequently removes the high-quality USB microphone, the entries "HQ-Microphone" in preferred interface field 215 and "HQMic-1" in Input/Output Device field 220 would be removed from context table 200. In this example, the device driver for the high-quality USB microphone would perform this task. Alternatively, a separate program (e.g., a program for "uninstalling" devices and drivers) could de-populate context table 200. After the high-quality microphone is removed, the default microphone would once again be "Mic-1," the standard microphone.

Figure 3:
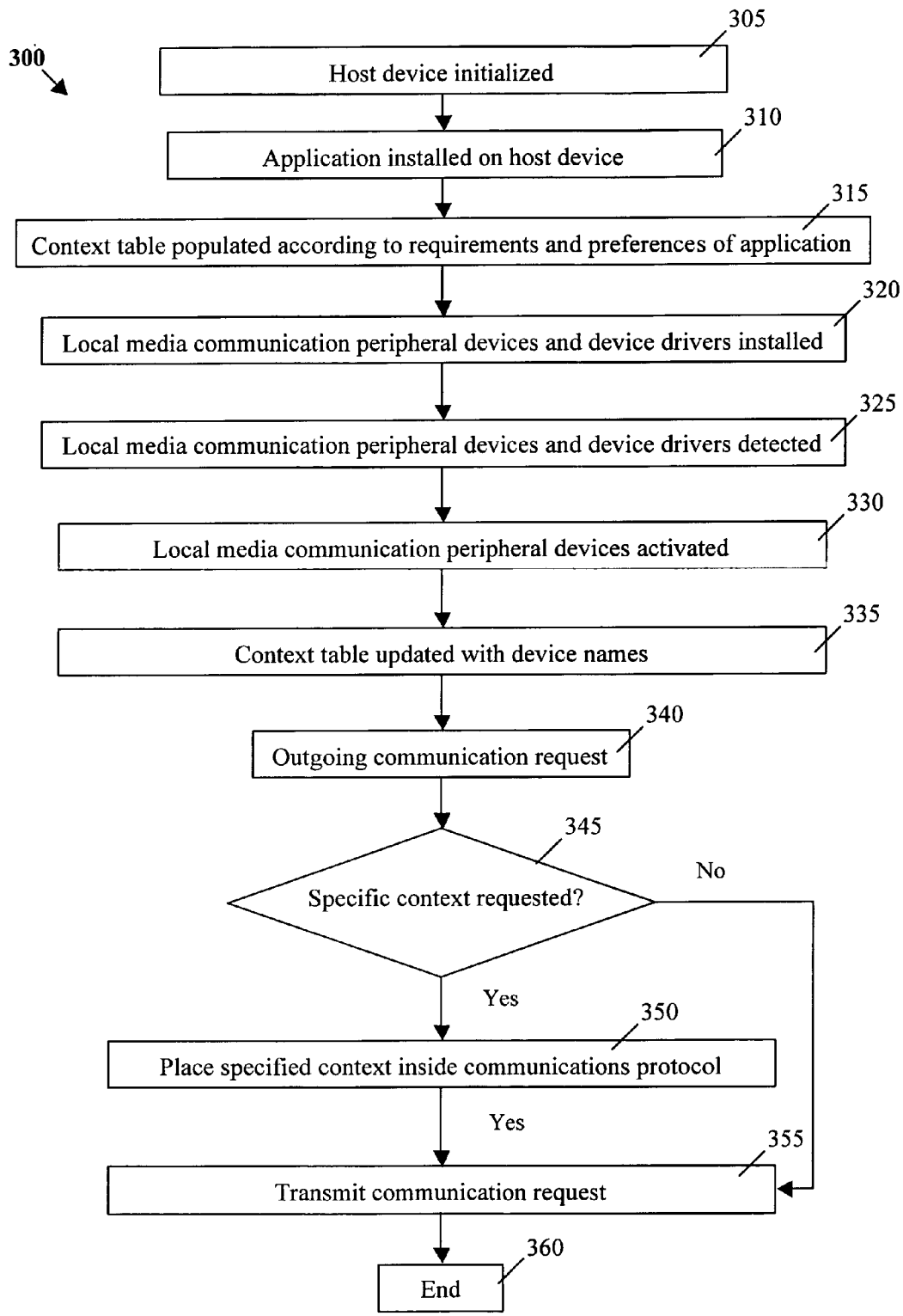
FIG. 3 is a flow chart that provides an overview of alternative methods of the present invention.

FIG. 3 is a flow chart that illustrates a generalized method 300 of forming an outgoing communication request having a specified context. Steps 305 through 335 parallel those of steps 105 through 135, described with reference to FIG. 1. In step 340, an outgoing communication request is formed. This request could be formed, for example, by a host device or by a local media communication peripheral device, such as a microphone, a webcam or a telephone.

In step 345, it is determined (e.g., by reference to context table 200) whether a specific context is to be requested. If not, the communication request will be transmitted without modification. (Step 355.) If a specific context is to be requested, the context will be included in the request, according to the communications protocol being used (step 350), and then the communication request will be transmitted. (Step 355.)

FIG. 4 illustrates one example of a communication context, which is in Extensible Markup Language ("XML") format in this case. Those of skill in the art realize that XML is essentially plain text with the addition of some XML tags enclosed in angle brackets. Software that can handle plain text can also handle XML. In a simple text editor, the XML tags will be visible and will not be handled specially. In an XML-aware application however, the XML tags can be handled specially. The tags may or may not be visible, or have a functional meaning, depending on the nature of the application.

XML declaration 405 defines the XML version and the character encoding used in the document. In this example, the document conforms to the 1.0 specification of XML and uses Universal Transformation Format number 8 ("UTF-8") character conversion. UTF-8 converts Unicode characters, which are 16 bits each, into 8-bit characters.

Line 410 describes the root element of the document. Here, line 410 indicates that the document is a call context. Line 490 defines the end of the root element "call context." The intervening lines define aspects of this exemplary call context.

Here, destination line 420 defines a dial-pattern to which a context can be applied when making a call. Action line 430 can be used to define various actions, including but not limited to Answer, Ring and Busy. Device type line 440 can define various types of devices, e.g., media communication peripheral devices such as speakers, microphones, cameras and displays.

Device action line 450 can be used to define various device states/actions, such as "On," "Mute" (for audio and video), "Beep," etc. URL line 460 can point to media of various types, including but not limited to Hyper Text Markup Language ("HTML"), movie, Real Time Streaming Protocol ("RTSP"), etc.

Line 470 indicates an encryption type: MD5Digest is 128 bit hash computed with the entire context using a shared key either configured or exchanged between participating devices. A device can authenticate/validate the context by computing a local MD5 digest and comparing that with the digest received. Such mechanisms provide a secure exchange of context data between communication devices.

Although a variety of protocols may be used to implement the present invention, some preferred implementations use Session Initiated Protocol, also known as Session Initiation Protocol ("SIP"), a signaling protocol for Internet conferencing, telephony, presence, events notification, instant messaging and other services. RFC 3261, which describes the SIP. protocol, is hereby incorporated by reference in its entirety.

The SIP protocol initiates call setup, routing, authentication and other feature messages to endpoints within an IP domain. SIP is independent of the packet layer and it is a application layer protocol. SIP typically is used over UDP or TCP. SIP when using unreliable datagram services (UDP) provides its own reliability mechanism.

SIP addresses users by an email-like address and re-uses some of the infrastructure of electronic mail delivery such as DNS MX records or using SMTP EXPN for address expansion. SIP addresses (URLs) can also be embedded in web pages. SIP is addressing-neutral, with addresses expressed as URLs of various types such as SIP, H.323 or telephone (E.164).

Some implementations of the invention, including some SIP-based implementations, use the Multipurpose Internet Mail Extensions ("MIME") specification. MIME is useful, e.g., to format non-ASCII messages so that they can be sent over the Internet. Many e-mail clients now support MIME, which enables them to send and receive graphics, audio, and video files via the Internet mail system. In addition, MIME supports messages in character sets other than ASCII. There are many predefined MIME types, such as GIF graphics files and PostScript files. It is also possible for users to define MIME types. In addition to e-mail applications, Web browsers also support various MIME types. This enables the browser to display or output files that are not in HTML format.

An SIP session is initiated when an "initiator," also referred to as a "calling party" or "caller," sends an INVITE request. A caller retains this role from the time it sends the initial INVITE that established a dialog until the termination of that dialog.

FIG. 5 illustrates one example of an SIP INVITE with multi-part MIME contents, containing an XML call context, according to one implementation of the present invention.

In this example, an SIP caller is inviting a remote station to join in a Push to Talk (PTT) "context" by sending the context details and expected behavior of remote media devices in MIME part of the SIP message. The context is instructing the Remote station to enable the speaker and mute the microphone after remote end-point accepts the invitation for communication. In this example, the remote end point is being referred as part of a PTT group "SALES." The remote end point can validate the invitation using the group secret before participating in PTT session.

Figure 6:
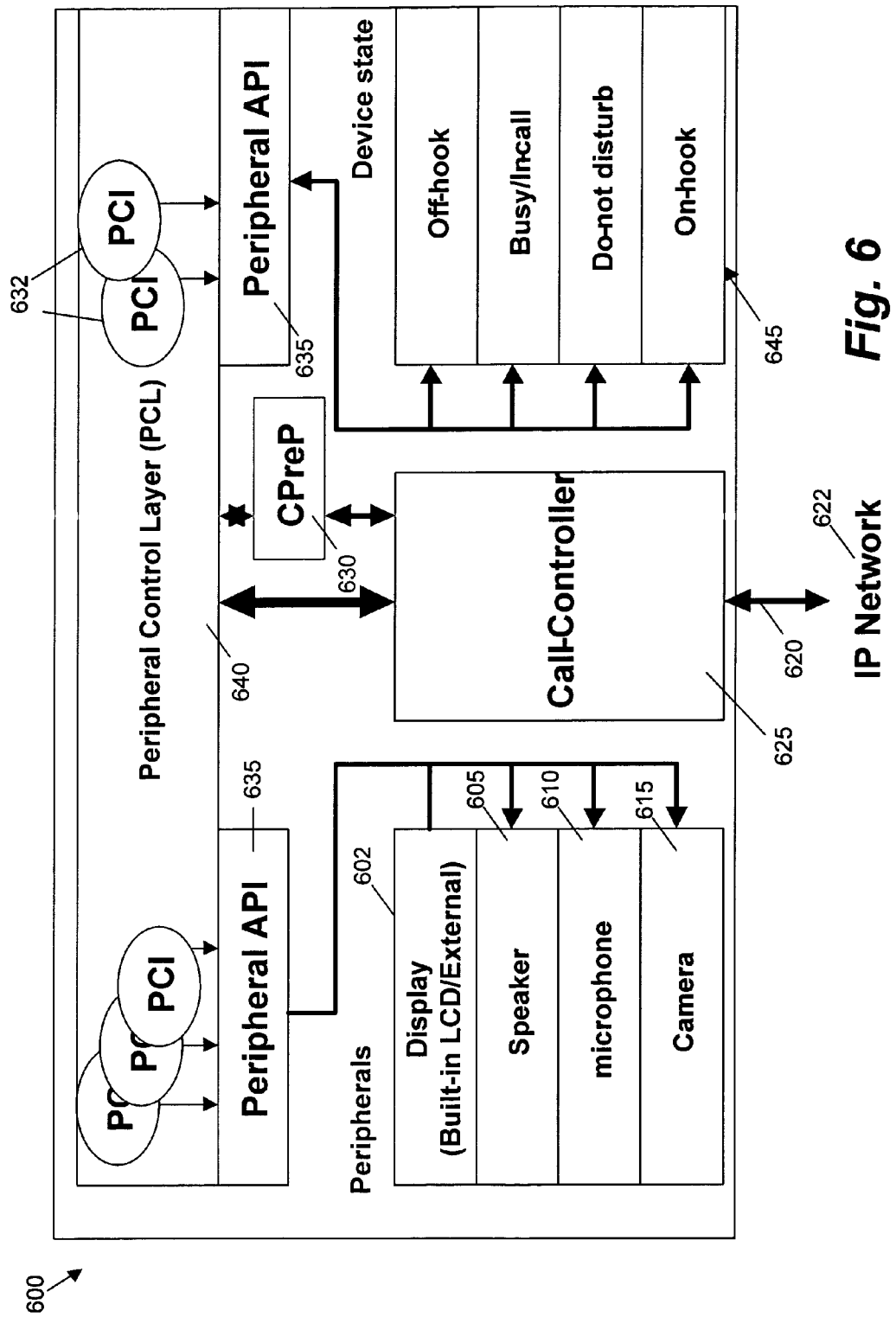
FIG. 6 is a block diagram illustrating a video telephone that may be used in accordance with the present invention.

FIG. 6 illustrates a video telephone that may be used to implement various aspects of the invention. Although video telephone 600 is but one example of a device that may be used in accordance with the invention, video telephone 600 includes features that, once understood, may be generally instructive in terms of how the present invention can be more broadly implemented.

Video telephone 600 includes various local media communication peripheral devices, including display 602, speaker 605, microphone 610 and camera 615. These local media communication peripheral devices may be built-in, but are preferably modular to allow for convenient upgrades. Network interface 620 connects video telephone 600 (in particular, call controller 625) with communications network 622.

Call pre-processor engine ("CPreP"). 630 intercepts every outgoing call and interacts with peripheral control layer ("PCL") 640 to control the local media communication peripheral devices. The peripherals are controlled according to the context for a given destination call pattern.

Peripheral API (PAPI) 635 is a public application program interface ("API") to control various configured and/or discovered local media communication peripheral devices. In this example, PAPI 635 is the USB protocol. Accordingly, PAPI 635 controls peripherals 602, 605, 610 and 615 and controls device states 645. Peripheral control interfaces ("PCIs") 632 are scripts that execute locally and that use PAPI 635 to control local media communication peripheral devices.

PCL 640 is responsible for validation, locating contexts and invoking the appropriate peripheral device control. Call controller 625 inspects the context of a received call and passes the context to PCL 640.

Suppose the context of an incoming call is received in the content body of an SIP message as part of multi-part MIME format along with the SDP data for audio/video connections, and that the type of context data is application/XML, as shown in FIG. 5. Call controller 625 would inspect the content body and search for a context. If call controller 625 finds a context, call controller 625 would pass the context to PCL 640 for an action.

PCL 640 would communicate the success or failure of the context to call controller 625 with enough data to respond to the caller with an appropriate SIP response. A context can be part of a request or a final response. In either case, PCL 640 would be contacted with the context. A call context for outgoing calls can be stored on the voice/video device associated with a called number.

Once a communications request can be put into a context, a variety of functions can be implemented according to various aspects of the present invention. For example, some implementations provide a real-time protocol ("RTP") media fork (e.g., video conferencing to audio conferencing). Other implementations provide a distinctive ring based on the caller. Still other implementations cause an end-point to be redirected to prompt for authorization when making international calls.

Alternative implementations enable "push-to-talk" ("PTT") features. By defining a PTT context on a device, the device can participate in a PTT session. The PTT session may take place in either peer-to-peer mode or Group mode. Group mode can employ a Media Arbiter to control the floor among the participants and ensure that only one person can talk at a time. In peer-to-peer mode, two endpoints can talk to each other directly without the need for a Media Arbiter.

Figure 7:
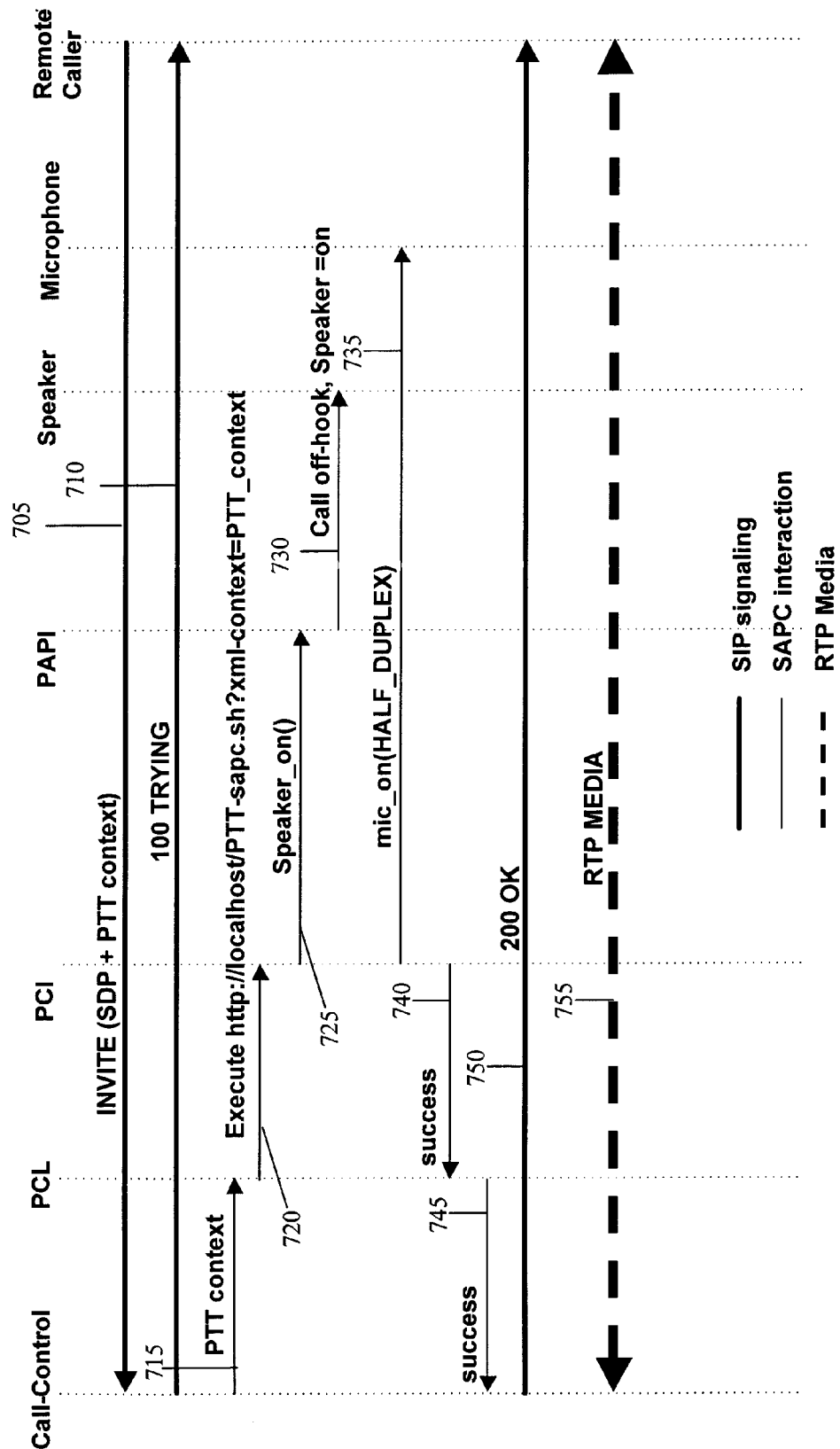
FIG. 7 is a flow diagram illustrating a method of handling an incoming call for a peer-to-peer PTT session using SIP protocol, according to an aspect of the invention.

A peer-to-peer mode of PTT will be described next with reference to FIGS. 7 and 8. In step 705, a remote caller sends an SIP INVITE (including session description protocol ("SDP") and a PTT context) to video telephone 600. Call controller 625 sends an SIP message back to the remote caller, indicating that video telephone 200 is trying to process the communication request. (Step 710.) Call controller 625 inspects the content body, finds the PTT context and passes the context to PCL 640 for an action. (Step 715.)

As part of the configuration, a context has an associated action/script. Once context is located associated action/script is available for execution. (Step 720.) PCL 640 instructs PCI 632 to execute a command according to the received context. Accordingly, PCI 632 indicates to PAPI 635-that speaker 605 should be turned on. (Step 725.) PAPI 635 turns speaker 605 on, enables a device state of "off hook" and turns microphone 610 on in "half duplex" mode. (Steps 730 and 735.)

PCI 632 indicates successful completion of the foregoing steps to PCL 640 (step 740), which conveys the message to call controller 625. Call controller 625 sends an SIP "O.K." response to the remote caller, indicating that video telephone 600 is ready to receive the requested communication. (Step 750.) The remote caller responds by initiating an RTP media session.

Figure 8:
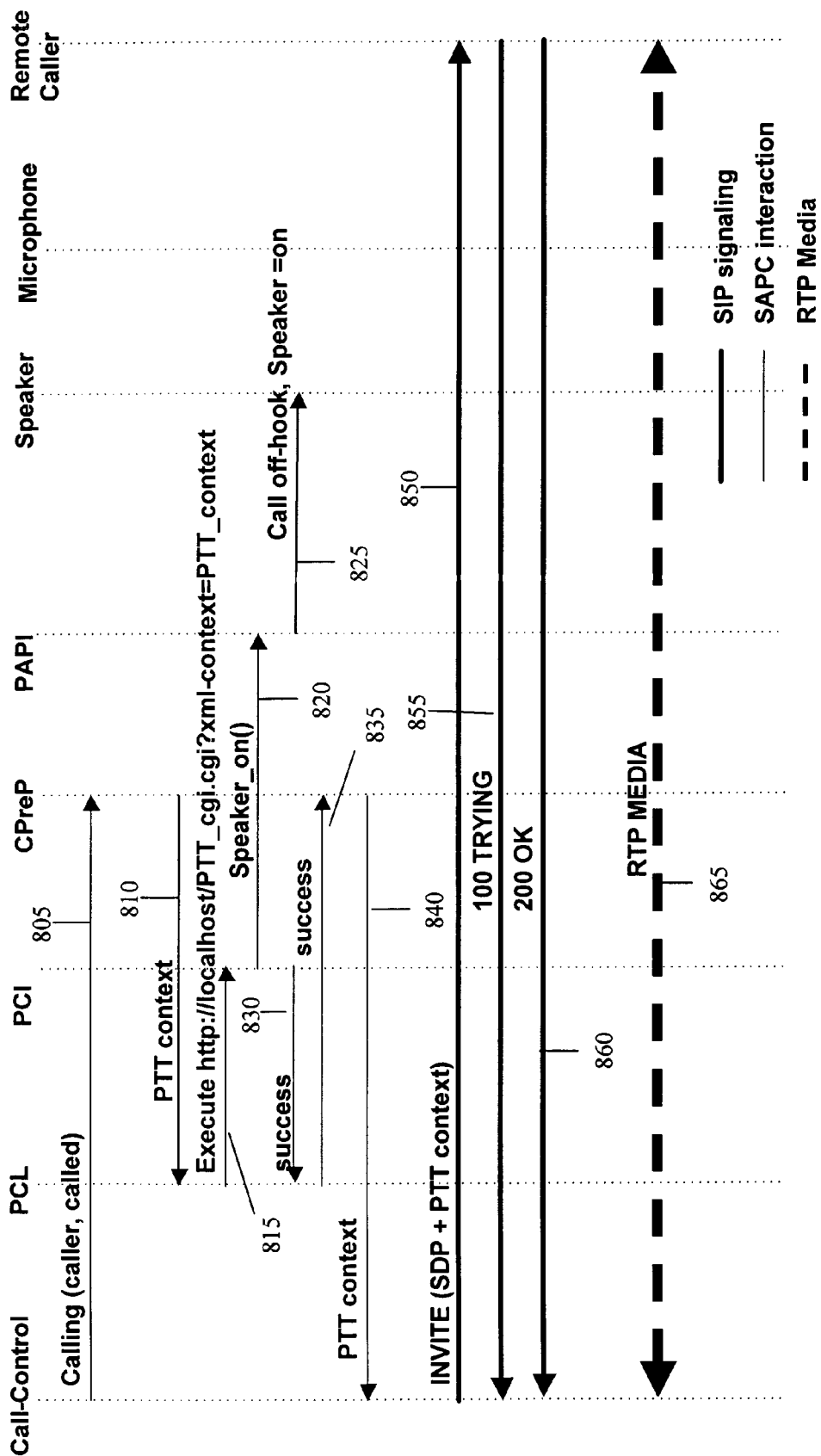
FIG. 8 is a flow diagram illustrating a method of handling an outgoing call for a peer-to-peer PTT session, according to an aspect of the invention.

FIG. 8 is a flow chart that outlines a process of initiating a PTT session from a local device. In step 805, CPreP 630 intercepts an outgoing call from call controller 625 and then interacts with PCL 640 to control the local media communication peripheral devices. CPreP 630 matches the outgoing call with the interfaces used on the local device and then enters in the appropriate method for the call. Accordingly, in step 810 CPreP 630 instructs PCL 640 to control the peripherals according to the PTT context indicated in the outgoing call. The PTT context is located based on the destination call pattern.

PCI 632 indicates to PAPI 635 that the speaker 605 should be turned on (step 820), so PAPI 635 turns on speaker 605 and causes an "off hook" device state (step 825). PCI 632 indicates success to PCL 640, which forwards the successful indication to CPreP 630. CPreP 630 instructs call controller 625 to send an SIP INVITE to the remote device (step 840), which call controller 625 does in step 850.

The remote device indicates that it is trying to process the INVITE (step 855) and, if the attempt is successful, sends an OK message in step 860. Then, an RTP session commences. (Step 865.)

Figure 9:
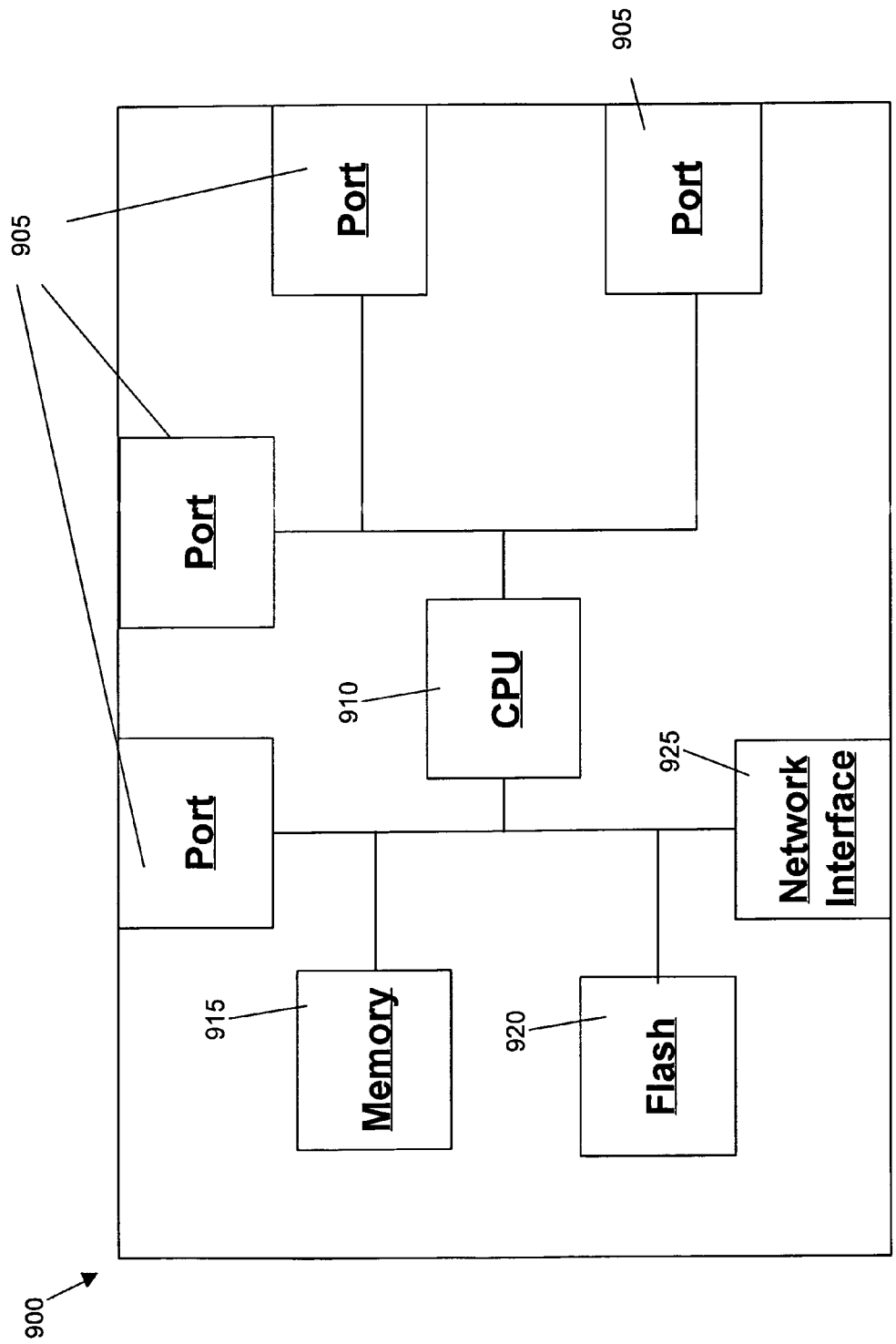
FIG. 9 is a block diagram illustrating a media device that may be used in accordance with the present invention.

FIG. 9 is a block diagram that indicates a simplified version of the hardware of one exemplary host device that may be used to implement some aspects of the present invention. Host device 900 includes 4 ports 905 in this example, each of which is configured for communication with a local media communication peripheral device.

Flash memory 920 is used to store a program (a "bootloader") for booting/initializing host device 900. The bootloader, which is usually stored in a separate, partitioned area of flash memory 920, also allows host device 900 to recover from a power loss, etc.

Information, including but not limited to information received on any of ports 905 and network interface 925, may be stored in memory 915. New versions of the image file (e.g., the running, base image necessary to operate host device 900) may be copied into flash memory 920 from memory 915.

CPU 910 may be used to control other components of host device 900. For example, CPU 910 may control one or more local media communication peripheral device according to any of the methods described herein.

Figure 10:
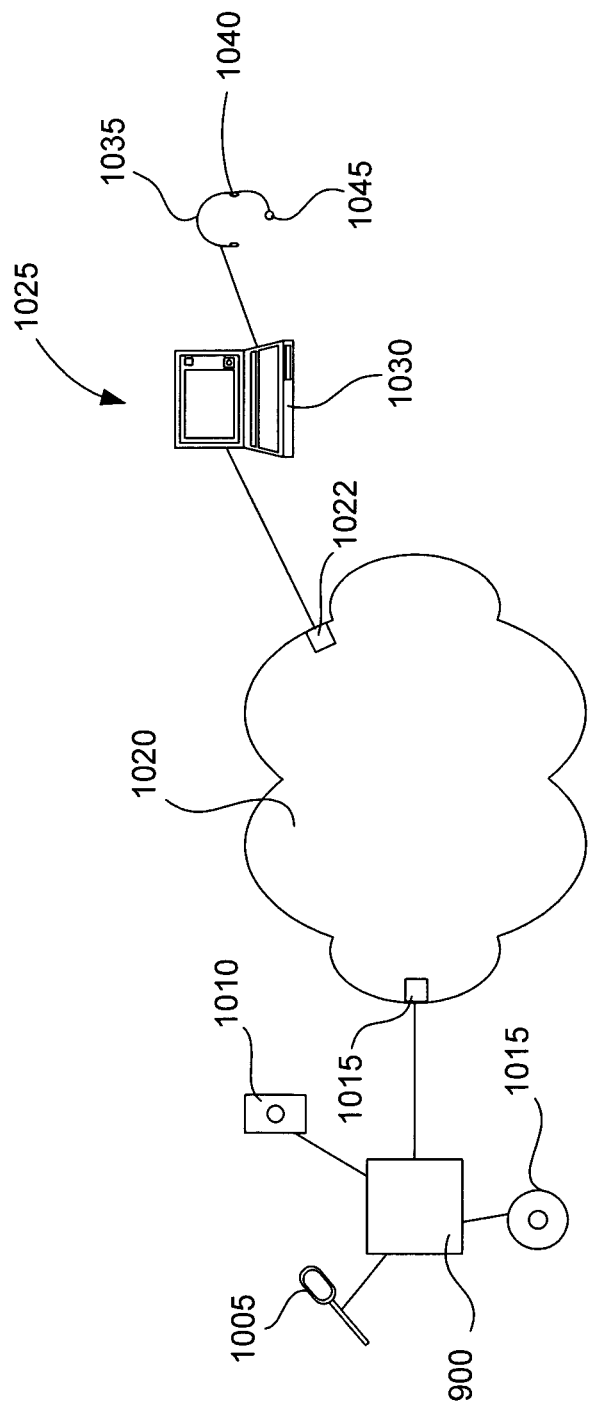
FIG. 10 is a simplified illustration of a communication network that may be used to implement some aspects of the invention.

FIG. 10 illustrates host device 900 and a remote device 1025 connected for communication over network 1020. In this example, microphone 1005, speaker 1010 and camera 1015 are connected to ports 905 of host device 900. Internet service provider ("ISP") 1015 provides connectivity between host device 900 and network 1020, which is the Internet in this example.

ISP 1022 provides connectivity between remote device 1025 and network 1020. Remote device 1025 includes laptop 1030. Headset 1035, featuring headphones 1040 and microphone 1045, is connected to laptop 1030.

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

For example, although much of the foregoing discussion has described end points as being base modules or media communication peripheral devices, an end point can be a portion of a media communication peripheral device, e.g., a portion closest to the user. For example, a digital signal processor ("DSP") in a headphone/ear set has enough intelligence to be an endpoint according to some implementations of the invention. The DSP could, for example, change the volume level of the ear set according to the level of background noise. In addition, those of skill in the art will appreciate that other devices and networks not illustrated herein, such as wireless devices and networks, PDAs, etc., may also be used to implement various aspects of the invention For example, some implementations described above provide a single end device with which the local peripheral devices are in communication/interfaces "attach" and according to which a context table is built. Alternative embodiments provide a "grouping" or "cluster" of devices, e.g., with one "root" device to which all the others register and/or proxy to. According to some such implementations, the root device answers "calls" or incoming communication requests. The root device then directs the relevant components of the incoming communication to, and transmits the relevant components of the outgoing communication from, the appropriate devices in the cluster. As in other embodiments, the devices could be selected according to a user's preferences, e.g., as defined by a context table that the root device can access. The user could indicate one preference (or set of preferences) when the user expects to work at a desk and another set of preferences when the user expects to work in another location (e.g., speakers, microphones, a video camera and a laptop in a conference room) or when the user intends to roam (e.g., a cellular telephone and a headset). To other devices in communication with the cluster, it would seem as if a communication were being made with one device.

Moreover, using the present invention in combination with some of the methods of implementing USB over IP, as described in U.S. patent application Ser. No. 11/006,989, entitled "Method And System For Controlling Transmission Of USB Messages Over A Data Network Between A USB Device And A Plurality Of Host Computers" and U.S. patent application Ser. No. 11/006,988, entitled "Method And System For Sending And Receiving USB Messages Over A Data Network," both of which were filed on Dec. 7, 2004 and both of which are hereby incorporated by reference, great flexibility may be achieved in deploying media communication peripheral devices. For example, a single host device in a first location could be associated with media communication peripheral devices disposed in various locations.

Accordingly, the present embodiments are to be considered as illustrative and not restrictive, and the invention is not to be limited to the details given herein, but may be modified within the scope and equivalents of the appended claims.

We claim:

1. A method, comprising:
    receiving a plurality of first communication signals associated with a communication session from a communication network, each of the plurality of first communication signals comprising at least one component selected from the group consisting of a first data component, a first audio component and a first video component;
    selecting a first communication signal from the plurality of first communication signals;
    selecting at least a first component of the first communication signal for communication with a first local media communication peripheral device, the first component having a first data quality;
    preparing the first component of the first communication signal for transmission to the first local media communication peripheral device by downgrading the first data quality of the first component to a second data quality, wherein the first data quality of the first component is superior to the second data quality of the first component prepared for communication with the first local media communication peripheral device;
    transmitting the first component of the first communication signal to the first local media communication peripheral device after preparing the first component of the first communication signal for transmission to the first local media communication peripheral device; and
    applying a differentiated billing scheme such that billing is performed for the communication session based, at least in part, on the second data quality of the first component transmitted to the first local media communication peripheral device;
    wherein the selecting and preparing steps are performed in accordance with preferences associated with the first local media communication peripheral device such that the second data quality of the first component transmitted to the first local media communication peripheral device is lower than the first data quality of the first component.

2. The method of claim 1, wherein the selecting and preparing steps are performed according to stored preference data indicating the preferences associated with the first local media communication peripheral device.

3. The method of claim 2, wherein the stored preference data are components of stored registration data.

4. The method of claim 3, wherein the registration data comprise data selected from context data, media type data, preference data and interface data.

5. The method of claim 3, further comprising dynamically compiling registration data when a media communication peripheral device is connected to a host device.

6. The method of claim 2, wherein the preference data indicates a first subset of components of communication signals to be selected for transmission to the first local media communication peripheral device.

7. The method of claim 6, wherein the preference data further indicates a second subset of the components of communication signals that are not to be transmitted to the first local media communication peripheral device.

8. The method of claim 2, wherein the preference data indicates user preferences of an endpoint that is subject to differentiated billing.

9. The method of claim 1, further comprising:
receiving a local signal from a second local media communication peripheral device, the local signal having a third attribute that differs from a corresponding attribute of the first communication signal received from the communication network;
forming a second communication signal based, at least in part, on the local signal, the second communication signal comprising a component selected from the group consisting of a second data component, a second audio component and a second video component; and
transmitting the second communication signal to the communication network.

10. The method of claim 9, wherein the second communication signal comprises preference data regarding at least one component of the second communication signal.

11. The method of claim 1, wherein the first communication signal further comprises preference data regarding at least one component of the first communication signal, wherein the preference data indicates at least one of whether the at least one component of the first communication signal is to be selected for transmission to the first local media communication peripheral device, or conditions for accepting the at least one component of the first communication signal by the first local media communication peripheral device.

12. The method of claim 1, wherein the first component comprises the first audio component, wherein the first data quality is superior to the second data quality and wherein the preparing step comprises downgrading the first audio component from the first data quality to the second data quality.

13. The method of claim 1, further comprising:
determining that the first local media communication peripheral device has been disconnected;
determining that a second local media communication peripheral device has been connected;
dynamically compiling registration data for the second local media communication peripheral device, the registration data comprising data selected from context data, media type data, preference data and interface data;
selecting a second component of a first communication signal in the plurality of first communication signals for communication with the second local media communication peripheral device;
preparing the second component of the first communication signal for transmission to the second local media communication peripheral device; and
transmitting the second component of the first communication signal to the second local media communication peripheral device after preparing the second component of the first communication signal for transmission to the second local media communication peripheral device.

14. The method of claim 1, further comprising:
ignoring a second component of the first communication signal, wherein the second component is not prepared for transmission to the first local media communication peripheral device.

15. The method of claim 1, further comprising:
preparing a second component of the first communication signal for transmission to a second local media communication peripheral device;
wherein the second component is not prepared for transmission to the first local media communication peripheral device.

16. The method as recited in claim 1, wherein the first communication signal further comprises the preferences associated with the first local media communication peripheral device.

17. The method as recited in claim 16, wherein the preferences associated with the first local media communication peripheral device comprise capabilities of the first local media communication peripheral device.

18. The method as recited in claim 1, wherein the preferences associated with the first local media communication peripheral device comprise capabilities of the first local media communication peripheral device.

19. An apparatus comprising:
one or more processors; and
one or more memories, at least one of the processors or the memories being configured for:
receiving a plurality of first communication signals associated with a communication session from a communication network, each of the plurality of first communication signals comprising at least one component selected from the group consisting of a first data component, a first audio component and a first video component;
selecting a first communication signal from the plurality of first communication signals;
selecting at least a first component of a first communication signal of the plurality of first communication signals for communication with a first local media communication peripheral device, the first component having a first data quality;
preparing the first component of the first communication signal for transmission to the first local media communication peripheral device by downgrading the first data quality of the first component to a second data quality such that the second data quality is lower than the first data quality, wherein the first data quality of the first component is superior to the second data quality of the first component prepared for communication with the first local media communication peripheral device;
transmitting the first component of the first communication signal to the first local media communication peripheral device after preparing the first component of the first communication signal for transmission to the first local media communication peripheral device; and applying a differentiated billing scheme such that billing is performed for the communication session based, at least in part, on the second data quality of the first component transmitted to the first local media communication peripheral device;

wherein the selecting and the preparing are performed in accordance with preferences associated with the first local media communication peripheral device such that the second data quality of the first component transmitted to the first local media communication peripheral device is lower than the first data quality of the first component.

20. The apparatus of claim 19, at least one of the processors or the memories being further configured for performing steps, comprising:

determining that the first local media communication peripheral device has been disconnected;

determining that a second local media communication peripheral device has been connected;

dynamically compiling registration data for the second local media communication peripheral device, the registration data comprising data selected from context data, media type data, preference data and interface data;

means for selecting a second component of a first communication signal for communication with the second local media communication peripheral device;

preparing the second component of the first communication signal for transmission to the second local media communication peripheral device; and transmitting the second component of the first communication signal to the second local media communication peripheral device after preparing the second component of the first communication signal for transmission to the second local media communication peripheral device.

21. A non-transitory computer-readable medium storing thereon computer-readable instructions that, when executed, cause a processor to perform the following steps:

receiving a plurality of first communication signals associated with a communication session from a communication network, each of the plurality of first communication signals comprising at least one component selected from the group consisting of a first data component, a first audio component and a first video component;

selecting a first communication signal from the plurality of first communication signals;

selecting at least a first component of the first communication signal for communication with a first local media communication peripheral device, the first component having a first data quality;

preparing the first component of the first communication signal for transmission to the first local media communication peripheral device by downgrading the first data quality of the first component to a second data quality, wherein the first data quality of the first component is superior to the second data quality of the first component that is prepared for communication with the first local media communication peripheral device; and transmitting the first component of the first communication signal to the first media communication peripheral device after preparing the first component of the first communication signal for transmission to the first local media communication peripheral device; and applying a differentiated billing scheme such that billing is performed for the communication session based, at least in part, on the second data quality of the first component transmitted to the first local media communication peripheral device;

wherein the selecting and preparing steps are performed in accordance with preferences associated with the first local media communication peripheral device such that the second data quality of the first component transmitted to the first local media communication peripheral device is lower than the first data quality of the first component.

22. The non-transitory computer-readable medium of claim 21, further comprising instructions for performing the following steps:

determining that the first local media communication peripheral device has been disconnected;

determining that a second local media communication peripheral device has been connected;

dynamically compiling registration data for the second local media communication peripheral device, the registration data comprising data selected from context data, media type data, preference data and interface data;

selecting a second component of a first communication signal for communication with the second local media communication peripheral device;

preparing the second component of the first communication signal for transmission to the second local media communication peripheral device; and transmitting the second component of the first communication signal to the second local media communication peripheral device after preparing the second component of the first communication signal for transmission to the second local media communication peripheral device.

* * * * *